Aug. 26, 1952   V. D. BARKER ET AL   2,608,090
TESTING MACHINE FOR BALL BEARINGS
Filed July 29, 1948   2 SHEETS—SHEET 1
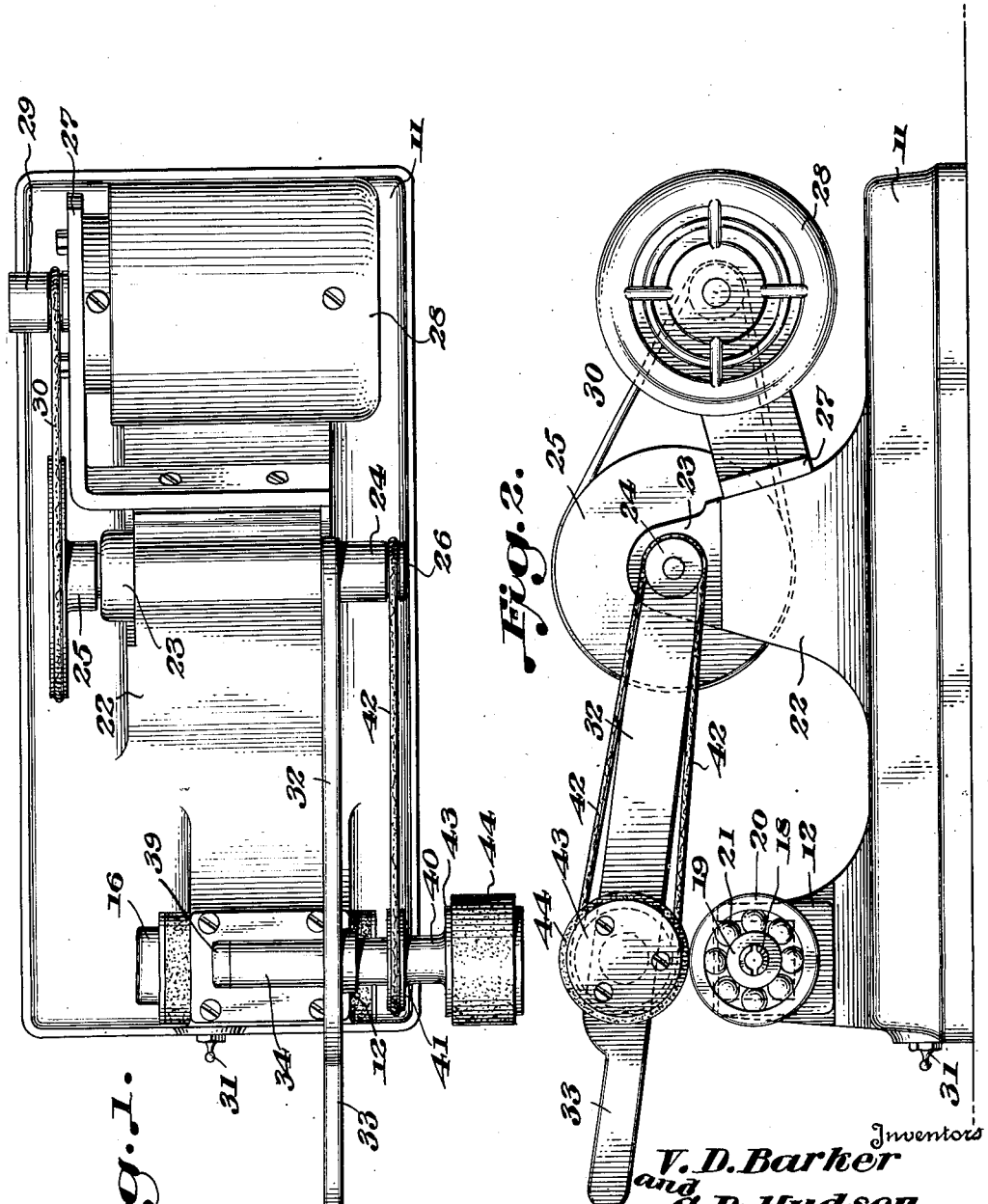
Inventors
V. D. Barker
and C. D. Hudson,
By
Mason, Porter, Miller & Stewart
ATTORNEYS

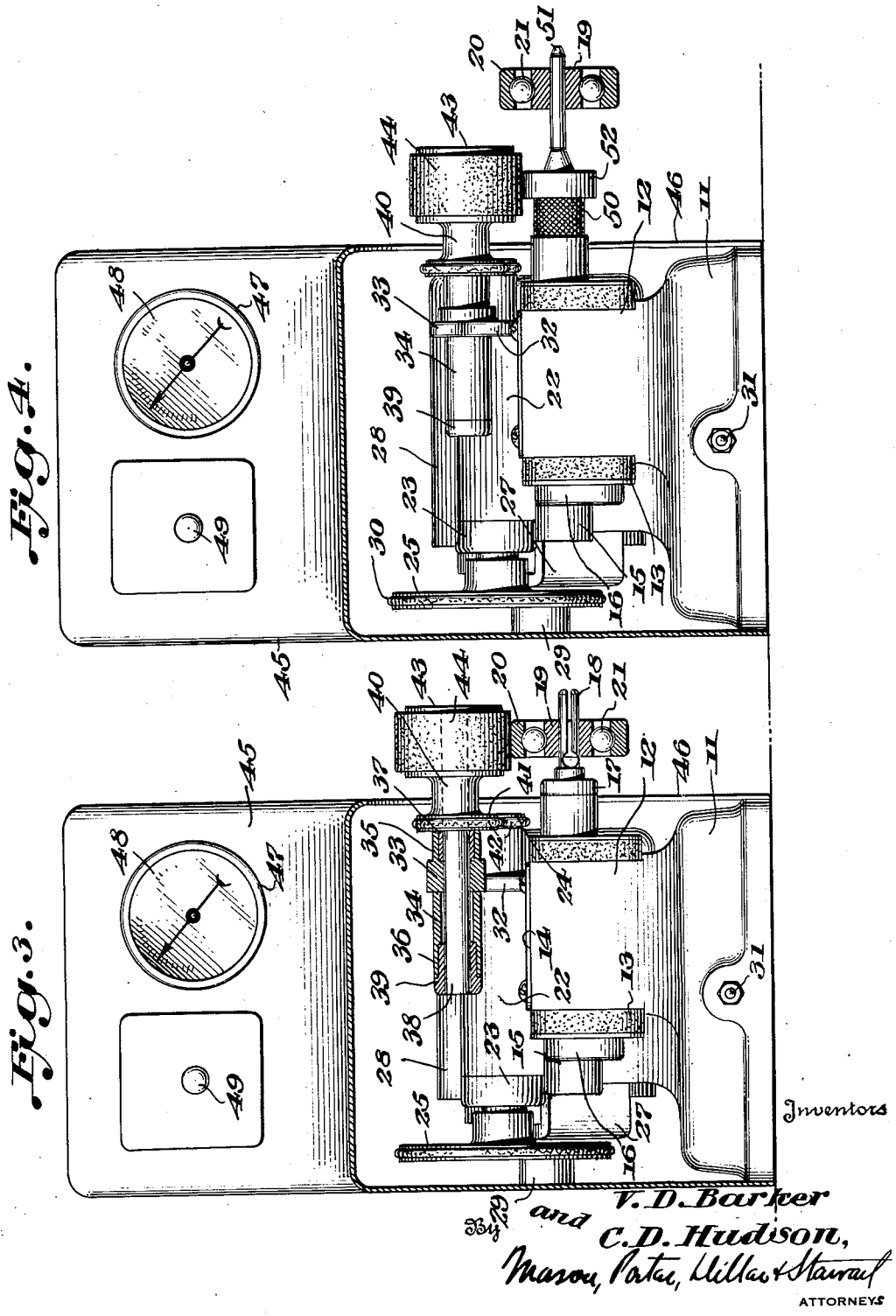

Patented Aug. 26, 1952

2,608,090

UNITED STATES PATENT OFFICE 2,608,090

TESTING MACHINE FOR BALL BEARINGS

Virgil D. Barker, Westfield, N. J., and Clough D. Hudson, Chevy Chase, Md.

Application July 29, 1948, Serial No. 41,255

11 Claims. (Cl. 73—69)

The following specification relates to certain improvements in testing machines for ball-bearings.

Ball-bearings either when first manufactured, or later after extended use, may be subject to faults, such as small cracks, flats, scored balls, and similar defects. Any one of these or like imperfections may seriously hamper satisfactory operation. The presence of such a defect may be detected by the resulting vibrations set up during the normal rotation of the balls. In like manner, an imbalance will result in dynamic vibration.

It has been proposed to provide means for indicating or registering the vibration developed in a ball-bearing in this manner. It is the prime purpose of our invention to provide a machine which will register vibration developing from the rotation of the bearing balls in their cage, if one is used, and to send both the outer and inner race-ways moving separately or together.

It is the further object of this invention to register vibration or imbalance in any suitable manner such as audible or visual.

It is a still further object of our invention to provide freedom from interference from extraneous vibration during the test.

Another object of the invention is to render it easy to support or hold the ball-bearing while undergoing test.

Among the objects of our invention is to reduce the number of moving parts and correspondingly the factors which may interfere with a true indication of the vibration.

The embodiment of our invention is simple in design, easy and economical to construct, and rugged and durable in operation.

In showing the manner in which the invention may be carried out, we have illustrated the preferred form of the invention on the accompanying drawings in which:

Fig. 1 is a plan view of the testing machine with the housing removed;

Fig. 2 is a side-elevation of the testing machine arranged to test the bearing balls and the outer race-way;

Fig. 3 is a front elevation, partly in vertical section, with part of the housing removed and, Fig. 4 is a front elevation with part of the housing broken away and showing the machine modified to test the inner race way.

Briefly considered, the machine which is the embodiment of this invention comprises means for holding a ball-bearing assembly free from outside vibration and then rapidly rotating either the outer or inner race-way. Any structural defects, imperfections or dynamic imbalance will set up vibrations which are registered by the conventional microphone. These registrations may then be amplified by the usual means so that they will be rendered visible or audible.

As illustrated in the drawings, we have shown a base 11 made of light metal which, however, is reasonably free from vibration itself. At one end, the base rises to form a stirrup 12, which is open at the top. This stirrup carries a pad 13 which extends transversely of the base and stirrup. A cover plate 14, holds the pad within the stirrup 12.

The pad is a cushion of yieldable material; this may be foam rubber, a plastic sponge or the like which will form a yieldable and resilient support serving to dampen extraneous vibration.

A mandrel 15, preferably square in cross section, extends through the pad 13. One end of the mandrel has an attached microphone 16 by which vibrations are picked up and transmitted either mechanically or electrically. Other means are well known and need not be set out here in detail. The opposite end of the mandrel 15 is formed with a detachable arbor 17. This arbor is split at the end 18. By means of the end 18, the inner race 19 of a ball-bearing may be frictionally mounted in the manner illustrated in Figs. 2 and 3.

The outer race 20 of the ball-bearing surrounds the series of bearing balls 21 in the usual manner. The bearing balls may be held in position alone as shown in the drawings or may be held in the customary cage.

A standard 22 rises from a mid-point of the base 11. This forms a journal bearing 23 in which a revoluble counter-shaft 24 is mounted. One end of the shaft 24 carries a large pulley 25 while the opposite end carries a small pulley 26.

A bracket 27 is mounted above the base 11 preferably by attachment to one side of the standard 22. This bracket is the support for an electric motor 28. This motor 28 has a pulley 29. Other forms of motors may of course be substituted for the electric motor. A belt 30 drives pulley 25 from pulley 29.

An electric switch 31 is mounted in any convenient place on the base as shown to be in front. In this way rotation of the motor 28 and the pulley 26 is controlled at the operator's convenience.

An arm 32 is pivoted on the standard 22 concentric with, but independent of the counter shaft 24. A handle 33 extends forwardly of the arm beyond the front of the base 11.

The arm 32 has a sleeve 34 extending laterally in both directions. This sleeve provides the journal bearings 35 at one end and 36 at the opposite end. The bearing 35 has a bushing 37.

A rotary shaft 38, is carried within the journal bearings 35 and 36. A thrust bearing 39 mounted on the inner end of the shaft 38 holds the latter against longitudinal movement.

The outer end of the shaft 38 carries a fixed collar 40. This collar has a pulley 41 which is connected by means of a belt 42 with the pulley 26.

The collar 40 also terminates in a wheel 43. This wheel has a tread 44 of friction material such as rubber or the like.

The wheel 43 is constantly rotated by means of belt 42, and unless the arm 32 is held up by the handle 33, the tread 44 rests upon the outer race 20 and rotates the latter. This rotation is effected without, however, transmitting any vibration from the tread 44.

As shown in Figs. 3 and 4, the operating parts of the machine are housed in a cover 45. This cover rests around the base 11. It is, however, slotted at the side as indicated at 46, to permit the mandrel 15 and the arbor 17 to project and the collar 40 to be raised and lowered with respect to the ball-bearing being tested.

The front of the cover has a similar slot, not illustrated, to permit the handle 33 to be raised and lowered.

The front of the cover is provided with a window 47. This exposes to view a dial with an ammeter 48 or like indicator. An electric switch 49 is mounted in any convenient part of the cover. It forms a part of the amplifying circuit not illustrated, by which vibrations in the mandrel 15 picked up by the microphone 16 will be amplified and transmitted to the ammeter or like indicator 48.

The above description implies that the inner race 19 is held against rotation by frictional engagement on the arbor end 18. In this case, the rotary movement is confined to bearing balls 21 and the outer race 20.

In order to test the inner race 19 when it rotates, a fixture 50 is shown in Fig. 4 to be mounted on the arbor 17. This fixture forms a journal bearing with a rotary spindle 51. A part of the spindle 51 is enlarged to form a roller 52 which is located beneath the roller 42 and actuated by the tread 44.

The end of the spindle 51 holds the inner race 19 in the manner indicated in Fig. 3.

When the bearing assembly is mounted on the spindle 51, and the latter is rotated, vibration will be registered in the manner indicated above. The outer race 20 may be left free, but preferably is held against rotation by the fingers of the operator. In the latter circumstance, retaining the outer race stationary is accomplished without adding any vibration.

The machine as described above carries out the purposes of the invention as stated. While the preferred form has been illustrated, it is to be understood that many changes in structural details, proportions and material may be made without departing from the scope of the invention as defined in the following claims.

What we claim is:

1. A machine for testing ball-bearings comprising a base, a yieldable cushion mounted on the base, a mandrel held by the cushion, a vibration-detector carried by the mandrel, a mounting extending from the mandrel and adapted to carry a ball-bearing, an arm pivoted on the base, a rotary shaft journaled on the arm, said shaft having driving means and means for rotating the shaft to effect relative rotation of the parts of the ball-bearing when the arm is pivoted toward the mounting.

2. A machine for testing ball-bearings comprising a base, a yieldable cushion mounted on the base, a mandrel held by the cushion, a vibration-detector carried by the mandrel, an arbor extending from one end of the mandrel and adapted to support the inner race of a ball-bearing, an arm pivoted on the base, a rotary shaft journaled on the arm and having means engageable with the outer race of the bearing, and means for rotating the shaft to cause the said engageable means to rotate the outer race of the ball-bearing.

3. A machine for testing ball-bearings comprising a base, a yieldable cushion mounted on the base, a mandrel held by the cushion, a vibration-detector carried by the mandrel, an arbor extending from one end of the mandrel and adapted to support the inner race of a ball-bearing, a counter shaft journaled on the base parallel to the mandrel, an arm pivoted at the counter-shaft and extending over the mandrel, a journal-bearing on the arm opposite the arbor, a rotary shaft in the journal-bearing, a wheel on the rotary shaft, a friction tread on the wheel, a drive-belt between the shafts and means to rotate the counter-shaft.

4. A machine for testing ball-bearings comprising a base, a yieldable cushion mounted on the base, a mandrel held by the cushion, a vibration-detector carried by the mandrel, an arbor extending from one end of the mandrel and adapted to support the inner race of a ball-bearing, an arm pivoted on the base, a journal-bearing on the arm, a rotary shaft in the journal-bearing, a wheel on the shaft opposite the arbor, a friction tread on the wheel in contact with the outer race of the ball-bearing, a rotary motor mounted on the base and driving means connecting the motor with the rotary shaft.

5. A machine for testing ball-bearings comprising a base, a yieldable cushion mounted on the base, a mandrel held by the cushion, a vibration-detector carried by the mandrel, an arbor extending from one end of the mandrel and adapted to support the inner race of a ball-bearing, a standard on the base spaced from the pad, a journal-bearing in the standard, a counter-shaft in the journal-bearing, an arm pivoted on the standard concentrically with the counter-shaft, a journal-bearing on the arm, a rotary shaft in said last named journal-bearing, a wheel on the rotary shaft opposite the arbor and drive means connecting the two shafts.

6. A machine for testing ball-bearings comprising a base, a yieldable cushion mounted on the base, a mandrel held by the cushion, a vibration-detector carried by the mandrel, an arbor extending from one end of the mandrel and adapted to support the inner race of a ball-bearing, an arm pivoted to the base, a journal-bearing on the arm, a rotary shaft in the journal-bearing, a wheel on the shaft opposite the arbor, a friction tread on the wheel, a motor mounted on the base and drive means connecting the motor with the rotary shaft.

7. A machine for testing ball-bearings comprising a base, a yieldable cushion mounted on the base, a mandrel held by the cushion, a vibration-detector carried by the mandrel, an arbor extending from one end of the mandrel, a spindle rotatably mounted on the arbor and adapted to support the inner race of a ball-bearing, an arm pivoted on the base, a journal-bearing on the arm, a rotary shaft in the journal-bearing, a wheel on the shaft opposite the spindle, a friction tread on the wheel and means for rotating the shaft to cause the tread to rotate the inner race of the ball-bearing held on the spindle.

8. A machine for testing ball-bearings comprising a base, a yieldable cushion mounted on the base, a mandrel held by the cushion, a microphone carried by the mandrel, a mounting extending from one end of the mandrel and adapted to carry a ball-bearing for test, a shaft, a wheel on the shaft, mounting means for supporting the wheel in driving contact with a part of the ball-bearing, means for rotating the shaft, a cover for the base, and a meter on the cover operatively connected to the microphone to indicate vibration caused by the rotation of one ball-bearing race relative to the second ball-bearing race.

9. A machine for testing ball-bearings comprising a base, a yieldable cushion mounted on the base, a mandrel held by the cushion, a vibration-detector carried by the mandrel, a mounting extending from the mandrel and adapted to carry a ball-bearing, an arm pivoted on the base, and means carried on the arm for effecting relative rotation of the parts of the ball-bearing when the arm is moved toward the mounting.

10. A machine for testing ball-bearings comprising a base, a yieldable cushion on the base, a mandrel journaled on the cushion, a vibration-detector attached to the mandrel, a mounting extending from the mandrel to carry a ball-bearing, and a rotatable member pivotally mounted on the base for rotative actuation of one ball-bearing race relative to the other.

11. A machine for testing ball-bearings comprising a base, a yieldable cushion on the base, a mandrel journaled on the cushion, a vibration-detector attached to the mandrel, a mounting extending from the mandrel to carry a ball-bearing, and a rotatable member adjustably mounted on the base for driving a ball-bearing race free from vibration.

VIRGIL D. BARKER.
CLOUGH D. HUDSON.

REFERENCES CITED

The following references are of record in the file of this patent:

UNITED STATES PATENTS

| Number | Name | Date |
| --- | --- | --- |
| 97,640 | Hoffman | Dec. 7, 1869 |
| 1,133,687 | Wesley | Mar. 30, 1915 |
| 1,992,453 | Vincent | Feb. 26, 1935 |
| 2,009,997 | Germond | Aug. 6, 1935 |
| 2,211,779 | Holmes | Aug. 20, 1940 |
| 2,364,229 | McCormack | Dec. 5, 1944 |

FOREIGN PATENTS

| Number | Country | Date |
| --- | --- | --- |
| 645,132 | Germany | May 21, 1937 |